Patented Sept. 23, 1952

2,611,701

UNITED STATES PATENT OFFICE 2,611,701

VAT DYE PHOTOPRINTS

André Schoen, Bangor, Pa., assignor to General Aniline & Film Corporation, New York, N. Y., a corporation of Delaware No Drawing. Application November 6, 1947, Serial No. 784,529

6 Claims. (Cl. 95—88)

The present invention relates to the preparation of dye prints from sulfuric acid esters of leuco vat dyes while relying upon a prussian blue image to effect imagewise oxidation of the esters to the desired dye image.

It is proposed in U. S. P. 1,988,623 to produce photographic vat dye images by sensitizing a base with the sulfuric acid ester of a leuco vat dye and subjecting the sensitized base to exposure through a pattern by means of ultraviolet light. The action of the light and oxygen causes imagewise oxidation of the leuco ester to the vat dye proper. While theoretically this procedure seems to be of considerable merit, the fact is that it has never realized any commercial significance. This is probably attributable to the fact that the esters employed must be light sensitive but only exhibit this characteristic in the presence of water. This means that the base sensitized with the esters must be exposed under a negative when still wet or damp as a consequence of which the negative is stained and its utility impaired. Furthermore, of those esters which are light sensitive, many absorb actinic light thereby slowing down the printing speed to impractical limits.

It has now been discovered that excellent prints on a light background of high contrast and intensity can be obtained from the leuco esters of vat dyes by treating a base carrying a prussian blue image with a leuco sulfuric acid ester of a vat dye and an oxidizing agent and causing imagewise oxidation of the leuco ester by a catalytic effect of the prussian blue image. Upon removing the prussian blue image and the unoxidized ester by an alkaline solution, the desired vat dye images remain on the base. The preparation of vat dye images by this procedure constitutes the purposes and objects of the present invention.

The base on which the prussian blue image is recorded may be any film forming or fibrous material, such as paper, textile fabrics, cellulose esters and the like.

The prussian blue image is formed on the base according to usual practice. For instance, the base may be padded with a sensitizing solution of ammonium ferric citrate and potassium ferricyanide and the base exposed under a negative. The base is then washed and dried to yield the desired blue print.

The treating composition by which the vat dye image is produced may contain any leuco sulfuric acid ester of a vat dye. They may, for instance, be of the class of the indigos, thioindigos, mixed indigo-thioindigos, indanthrenes, benzanthrones and the like. Examples of leuco sulfuric acid esters of vat dyes which have been found suitable are the leuco sulfuric acid esters of the following vat dyes: Jade Green or bz-2-bz-2'-dimethoxy dibenzanthrone, 6.6'-dimethoxy thioindigo, the vat dye disclosed in Example 1 of U. S. P. 1,706,902, indigo, 5.5'.7.7'-tetrabromindigo, pentabromindigo, 2-monobromindigo, 5.5'-dichloro-6.6'-dibromindigo, 1.1'-dichloroindigo, 6.6'-diethoxy-thioindigo, the mixed indigos described in U. S. P. 1,925,217, the vat dyes disclosed in U. S. P. 1,809,224, the indanthrene vat dyes disclosed in U. S. P. 943,717, 3.4.8.9-dibenzopyrene quinone, the indanthrene disclosed in U. S. P. 995,936, dibromated pyranthrone, dibrom-dimethoxy-dibenzanthrone, dichlor-isoviolanthrene and the like. The leuco sulfuric acid esters of these compounds are for the most part available in the open market. In any case, the leuco sulfuric acid esters can be produced from these known vat dyes by reducing and esterifying the vat dyes in a non-aqueous reaction medium consisting of chlorsulfonic acid, an excess of pyridine, iron powder, and cuprous chloride. Alternatively, the leuco sulfuric acid esters of said vat dyes can be produced according to the method described by Lecher U. S. P. 2,403,226. The particular leuco ester selected will in most cases be dictated by the color desired for the print on the one hand and the availability of the ester on the other hand.

Any of the usual, well known oxidizing agents may be employed along with the leuco ester. Suitable oxidizing agents are, for example, hydrogen peroxide, potassium persulfate, peracetic acid, and the like. The oxidizing agent must be water soluble and must be relatively mild, i. e., have an oxidation potential somewhat comparable to that of hydrogen peroxide. This excludes such powerful oxidizing agents as potassium permanganate which causes overall oxidation of the leuco sulfuric acid ester.

The vat dye image may be developed by immersing the base carrying the blueprint into an aqueous, acid solution of the sensitizing composition of the leuco ester and oxidizing agent at slightly elevated temperatures, i. e., 50–70° C. or by padding the base carrying the blueprints with an aqueous solution of said treating composition and drying and steaming the so-treated base. Conversely, the print may be developed at room temperature by permitting the treated base to stand over a relatively long period, for instance, 30 minutes or so rather than by steaming.

The treating composition should, as stated, be on the acid side preferably having a pH of from 5 to 6. The desired acidity may be obtained by adding a relatively weak acid, such as oxalic acid, boric acid, acetic acid and the like.

After the vat dye print has been developed, the unoxidized ester and the prussian blue image are removed by treatment of the print in an aqueous alkaline solution at slightly elevated temperatures, say at about 40–60° C. A suitable solution for this purpose is a .2% solution of sodium hydroxide in water. It is preferable to soap the prints after the alkaline treatment to insure complete removal of the leuco ester since otherwise the ester remaining may be progressively oxidized thereby destroying the contrast of the print. After soaping, the prints are washed with water and dried.

The following examples serve to illustrate the invention but it is to be understood that the invention is not limited thereto. The parts are by weight unless otherwise stated.

*Example 1*

Cotton fabric is padded with the following blueprint sensitizing solution:

75 parts of ammonium ferric citrate,
27 parts of potassium ferricyanide, and
1000 parts of water.

After drying, the fabric is exposed under a negative and washed with water to produce a positive blueprint.

The print is then treated at 70° C. for 5 minutes in the following bath which has been rendered slightly acid to pH 6 with oxalic acid:

3 parts of the di-sulfuric acid ester of the leuco compound of 6.6'-dimethoxy thioindigo,
1.5 parts of hydrogen peroxide, and
1000 parts of water.

By this treatment the leuco ester is oxidized to 6.6'-dimethoxy indigo, the oxidation taking place imagewise as the result of the catalytic action of the prussian blue image.

The print is next immersed in a solution of:

2 parts of sodium hydroxide in
1000 parts of water at 50° C.

and washed with warm water for the purpose of eliminating the prussian blue image and the unoxidized ester of the thioindigo. To insure that the last vestiges of the unoxidized ester are removed, the print is finally soaped and again washed. There is thus produced an intense orange image of high contrast at the places originally occupied by the blueprint image.

*Example 2*

A blueprint is produced on cotton fabric as outlined in Example 1. The print is then padded with an aqueous solution consisting of:

10 parts of the leuco di-sulfuric acid ester of the vat dye disclosed in Example 1 of U. S. P. 1,706,902,
.9 part of hydrogen peroxide, and
70 parts of water, the solution being rendered slightly acid with oxalic acid. After padding, the fabric is dried and steamed for 2–5 minutes to effect the imagewise development of a black print of the vat dye of the ester employed. The print is then treated as in Example 1 for the purpose of removing the unoxidized ester and the prussian blue image.

Instead of developing the vat dye image by steaming the print, it can also be developed at room temperature by allowing the print to stand for 30 minutes.

*Example 3*

The procedure is the same as in Example 1 excepting that the leuco sulfuric acid ester employed is that of Jade Green. Upon development and after treatment to remove the blueprint and unoxidized leuco ester, an intense green image remains.

Various modifications of the invention will occur to persons skilled in the art, and I, accordingly, do not intend to be limited in the patent granted except as required by the appended claims.

I claim:

1. The process of producing vat dye images which consists in exposing under a pattern a fibrous base sensitized with a solution of ammonium ferric citrate and potassium ferricyanide to form a Prussian Blue image, treating the base with an aqueous solution of a sulfuric acid ester of a leuco vat dye, an oxidizing agent having an oxidizing potential of the order of hydrogen peroxide and a weak acid which imparts to the solution a pH of from about 5 to 6, and heating the base to effect development imagewise of the vat dye through catalytic oxidation engendered by the Prussian Blue image.

2. The process as defined in claim 1 wherein the vat dye image is developed by heating the base to a temperature of 50 to 70° C.

3. The process as defined in claim 1 wherein the vat dye image is developed by steaming the base.

4. The process as defined in claim 1, wherein the oxidizing agent is hydrogen peroxide.

5. The process as defined in claim 1, wherein the blueprint image and unoxidized leuco ester are removed by an alkaline treatment.

6. The process as defined in claim 1, wherein the leuco ester is the di-sulfuric acid ester of the leuco compound of 6.6'-dimethoxy thioindigo.

ANDRÉ SCHOEN.

REFERENCES CITED

The following references are of record in the file of this patent:

UNITED STATES PATENTS

| Number | Name | Date |
|---|---|---|
| 1,956,017 | Gaspar | Apr. 24, 1934 |
| 2,151,065 | Allison | Mar. 21, 1939 |
| 2,161,735 | Allison | June 6, 1939 |
| 2,213,745 | Schinzel | Sept. 3, 1940 |
| 2,227,981 | Schinzel | Jan. 7, 1941 |
| 2,444,567 | Husek | Jan. 6, 1948 |

FOREIGN PATENTS

| Number | Country | Date |
|---|---|---|
| 25,043 | Great Britain | 1898 |
| 2,474 | Great Britain | 1915 |
| 329,334 | Great Britain | May 13, 1930 |
| 521,833 | Great Britain | May 31, 1940 |